(12) United States Patent
Clements (10) Patent No.: US 10,303,270 B2
(45) Date of Patent: May 28, 2019

(54) LINEAR ENCODER FORCE TRANSDUCER

(71) Applicant: Microsoft Technology Licensing, LLC, Redmond, WA (US)

(72) Inventor: Bradley Edgar Clements, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/263,122

(22) Filed: Sep. 12, 2016

(65) Prior Publication Data
US 2018/0074602 A1   Mar. 15, 2018

(51) Int. Cl.
*G06F 3/0354* (2013.01)
*G01D 5/347* (2006.01)
(Continued)

(52) U.S. Cl.
CPC ....... *G06F 3/03542* (2013.01); *G01D 5/2454* (2013.01); *G01D 5/2457* (2013.01);
(Continued)

(58) Field of Classification Search
CPC ............. G06F 3/03542; G06F 3/03545; G06F 3/0386; G01D 5/34746; G01D 5/34776;
(Continued)

(56) References Cited

U.S. PATENT DOCUMENTS 3,508,246 A * 4/1970 Lenz ..................... H03M 1/645
  341/6
3,867,037 A * 2/1975 Litke ..................... G01B 11/00
  33/707
(Continued)

FOREIGN PATENT DOCUMENTS

CN     201993117 U    9/2011
JP       03287015 A   12/1991

OTHER PUBLICATIONS

Fleming, Andrew J., "A review of nanometer resolution position sensors: Operation and performance", In Journal of Sensors and Actuators A: Physical, vol. 190, Feb. 2013, pp. 106-126.
(Continued)

*Primary Examiner* — Dismery Mercedes
(74) *Attorney, Agent, or Firm* — NovoTechIP International PLLC (57) ABSTRACT

In implementations of a linear encoder force transducer, an encoder component generates light that enters a light input window of an encoder strip, and reflective surfaces disperse the light internally within the encoder strip. The encoder strip has etched lines formed cross-width of the encoder strip for emitted light that exits the encoder strip. The encoder component has gradated slots through which the emitted light from the encoder strip is detected by an array of photo transistors, each of the gradated slots corresponding to one of the photo transistors in the array of photo transistors. An encoder module can determine a linear displacement, such as representative of a force applied to a pen tip of a computer input pen, based on one or more of the photo transistors detecting the emitted light as the etched lines of the encoder strip move relative to the gradated slots of the encoder component.

20 Claims, 4 Drawing Sheets

(51) Int. Cl.
*G01D 5/244* (2006.01)
*G01D 5/245* (2006.01)
*G01D 5/36* (2006.01)
*G06F 3/038* (2013.01)
*G06F 3/042* (2006.01)

(52) U.S. Cl.
CPC ......... *G01D 5/24438* (2013.01); *G01D 5/347* (2013.01); *G01D 5/34715* (2013.01); *G01D 5/34723* (2013.01); *G01D 5/34746* (2013.01); *G01D 5/34776* (2013.01); *G01D 5/34792* (2013.01); *G01D 5/36* (2013.01); *G06F 3/0386* (2013.01); *G06F 3/03545* (2013.01); *G06F 3/0421* (2013.01); *G06F 2203/04105* (2013.01); *G06F 2203/04106* (2013.01)

(58) Field of Classification Search
CPC .. G01D 5/2457; G01D 5/34792; G01D 5/145; G01D 5/34707; G01D 5/24438; G01D 5/34715; G01D 5/36; G01D 5/38
See application file for complete search history.

(56) References Cited

U.S. PATENT DOCUMENTS

| | | | |
|---|---|---|---|
| 4,008,523 A | 2/1977 | von Voros | |
| 4,451,987 A | 6/1984 | Cusack | |
| 5,003,170 A * | 3/1991 | Masuda | G01D 5/2457 250/231.17 |
| 5,290,972 A | 3/1994 | Someya et al. | |
| 5,825,307 A * | 10/1998 | Titus | G01D 5/34792 341/13 |
| 6,229,140 B1 * | 5/2001 | Ishizuka | G01D 5/2457 250/231.18 |
| 6,627,870 B1 * | 9/2003 | Lapstun | A63F 9/183 250/221 |
| 6,707,029 B1 * | 3/2004 | Fuwa | G01D 5/34715 250/231.13 |
| 7,057,160 B2 * | 6/2006 | Ito | G01D 5/34715 250/231.13 |
| 7,312,437 B2 * | 12/2007 | Hane | G01D 5/366 250/231.18 |
| 7,619,208 B2 * | 11/2009 | Masada | G01D 5/34707 250/231.13 |
| 7,646,377 B2 * | 1/2010 | Geaghan | G06F 3/0317 345/173 |
| 8,188,421 B2 * | 5/2012 | Hane | G01D 5/38 250/231.14 |
| 8,228,508 B2 * | 7/2012 | Ishizuka | G01D 5/38 356/499 |
| 8,389,925 B2 * | 3/2013 | Shoji | G01D 5/34746 250/231.18 |
| 8,456,650 B2 | 6/2013 | Lal et al. | |
| 8,536,471 B2 | 9/2013 | Stern et al. | |
| 8,666,261 B2 * | 3/2014 | Takahashi | G01D 5/38 250/231.16 |
| 8,913,042 B2 | 12/2014 | Mercea et al. | |
| 9,121,733 B2 * | 9/2015 | Asano | G01D 5/34707 |
| 9,121,734 B2 * | 9/2015 | Kawatoko | G01D 5/34715 |
| 9,128,541 B2 | 9/2015 | Fergusson et al. | |
| 9,182,856 B2 | 11/2015 | Logan et al. | |
| 9,279,703 B2 * | 3/2016 | Nakamura | G01D 5/347 |
| 9,383,231 B2 * | 7/2016 | Yaku | G01D 5/34723 |
| 9,436,166 B2 * | 9/2016 | Yoshida | G05B 1/04 |
| 9,752,901 B2 * | 9/2017 | Kato | G01D 5/24438 |
| 9,766,096 B2 * | 9/2017 | Nagura | G01D 5/24485 |
| 10,024,695 B2 * | 7/2018 | Kato | G01D 5/34715 |
| 2001/0011699 A1 * | 8/2001 | Aoki | G01D 5/145 250/231.13 |
| 2004/0061044 A1 | 4/2004 | Soar | |
| 2005/0219231 A1 * | 10/2005 | Silverbrook | B41J 3/36 345/173 |
| 2005/0285026 A1 * | 12/2005 | Kawai | G01D 5/2457 250/231.13 |
| 2010/0243871 A1 * | 9/2010 | Hane | G01D 5/38 250/231.1 |
| 2011/0102379 A1 | 5/2011 | Lapstun et al. | |
| 2013/0001411 A1 * | 1/2013 | Tojo | G01D 5/34723 250/227.11 |
| 2013/0161499 A1 * | 6/2013 | Tobiason | G01D 5/34715 250/231.1 |
| 2015/0233737 A1 * | 8/2015 | Sasaki | G01D 5/34707 250/231.1 |
| 2015/0354992 A1 * | 12/2015 | Murokita | G01D 5/34715 318/640 |
| 2016/0116305 A1 * | 4/2016 | Miyazawa | G01D 5/38 356/499 |
| 2016/0178407 A1 * | 6/2016 | Yoshida | G01D 5/34707 250/231.13 |
| 2016/0238415 A1 * | 8/2016 | McAdam | G01D 5/24442 |
| 2016/0239112 A1 * | 8/2016 | Ballan | G06F 3/0383 |
| 2016/0313144 A1 * | 10/2016 | Otsuka | G01D 5/2053 |

OTHER PUBLICATIONS

Ioppolo, et al., "Micro-optical force sensor concept based on whispering gallery mode resonators", In Journal of Applied Optics, vol. 47, No. 16, Jun. 1, 2008, pp. 3009-3014.

Pollefliet, Jean., "Angular Position Sensors (Shaft Angle Transducer)", Published on: Dec. 9, 2013 Available at: http://www.powerguru.org/angular-position-sensors-shaft-angle-transducer/.

"International Search Report and Written Opinion Issued in PCT Application No. PCT/US2017/050001", dated Dec. 6, 2017, 12 Pages.

* cited by examiner

LINEAR ENCODER FORCE TRANSDUCER

BACKGROUND

A computer input pen, also commonly referred to as a stylus, a pen, and/or an input device, can be used to interact with a user interface on a touchscreen display of a computing device, such as on a tablet device or mobile phone. Some example interactions with a computer input pen include entering text, making selections, or providing input on the touchscreen display. A computer input pen can also be used as a digital pen to provide a user with a digital hand writing feature on the touchscreen display of a tablet device or mobile phone. Generally, interactions on the touchscreen display of a computing device with a computer input pen occurs when a tip of the input pen contacts the touchscreen display, and a pressure force on the pen tip can be registered with a force transducer in the computer input pen.

SUMMARY

This Summary introduces features and concepts of a linear encoder force transducer, which is further described below in the Detailed Description and shown in the Figures. This Summary should not be considered to describe essential features of the claimed subject matter, nor used to determine or limit the scope of the claimed subject matter.

A linear encoder force transducer is described. In implementations, a linear encoder includes an encoder component, an encoder strip, and an encoder module. The encoder component includes a light emitting diode (LED) that generates light, which enters a light input window of the encoder strip. Reflective surfaces of the encoder strip include light dispersal particles that disperse and reflect the light internally within the encoder strip. The encoder strip has etched lines formed cross-width of the encoder strip for emitted light that exits the encoder strip. The encoder component has gradated slots through which the emitted light from the encoder strip is detected by an array of photo transistors, where each of the gradated slots corresponds to one of the photo transistors in the array of photo transistors.

The encoder module can be implemented with a digital counter to determine a linear displacement, such as representative of a force applied to a pen tip of a computer input pen on a touchscreen display of a computing device. The linear displacement is based on one or more of the photo transistors detecting the emitted light as the etched lines of the encoder strip move relative to the gradated slots of the encoder component. The digital counter registers incremental steps of digital resolution as the etched lines of the encoder strip move relative to the gradated slots of the encoder component in a Moiré pattern. Additionally, the encoder component can include standoffs that moveably contact the encoder strip. The standoffs are designed to maintain separation between optical surfaces of the gradated slots of the encoder component and optical surfaces of the etched lines of the encoder strip.

BRIEF DESCRIPTION OF THE DRAWINGS

Implementations of a linear encoder force transducer are described with reference to the following Figures. The same numbers may be used throughout to reference like features and components that are shown in the Figures.

DETAILED DESCRIPTION

Implementations of a linear encoder force transducer are described. A linear encoder that operates based on detected light differentiation can be implemented in a computer input pen as a force transducer that is immune to the strict mechanical tolerances and calibration requirements of conventional force transducers. Further, the linear encoder force transducer generates a digital signal from an array of photo transistors and an AND gate summation digital counter, thus eliminating the need to convert a conventional force transducer analog signal for digital use. Generally, analog components require strict mechanical tolerances, manufacturing controls, and precise calibration to operate over a very small range of travel, such as for the pen tip of a computer input pen as it contacts a touchscreen display of a computing device. The linear encoder force transducer also provides the advantage of fine-step, digital resolution over larger axial deflections (e.g., small digital counts over longer distances) for a pen tip of a computer input pen when contact with a touchscreen display of a computing device applies a pressure force on the pen tip.

Additionally, orientation of the linear encoder force transducer in a computer input pen is perpendicular to the axis of travel of the pen tip mechanism, which helps to reduce mechanical shock damage and misalignment, and eliminates the strict calibration requirements of conventional force transducers. Although examples of the linear encoder force transducer are described with reference to implementation in a computer input pen, the design can also be used with haptic motors that may be utilized to move a pen tip in the axial direction beyond the limits of conventional sensor systems.

The linear encoder force transducer described herein includes an encoder component, an encoder strip, and an encoder module. The encoder component includes a light emitting diode (LED) that generates light, which enters a light input window of the encoder strip. Reflective surfaces of the encoder strip include light dispersal particles that disperse and reflect the light internally within the encoder strip. The encoder strip has etched lines formed cross-width of the encoder strip for emitted light that exits the encoder strip. The encoder component has gradated slots through which the emitted light from the encoder strip is detected by an array of photo transistors, where each of the gradated slots corresponds to one of the photo transistors in the array of photo transistors.

The encoder module implements the digital counter to determine a linear displacement, such as representative of a force applied to a pen tip of a computer input pen on a touchscreen display of a computing device. The linear displacement is based on one or more of the photo transistors detecting the emitted light as the etched lines of the encoder strip move relative to the gradated slots of the encoder component. The digital counter registers incremental steps of digital resolution as the etched lines of the encoder strip move relative to the gradated slots of the encoder component in a Moiré pattern. Additionally, the encoder component can include standoffs that moveably contact the encoder strip. The standoffs are designed to maintain separation between optical surfaces of the gradated slots of the encoder component and optical surfaces of the etched lines of the encoder strip.

Further, assembly tolerances of the linear encoder force transducer are significantly increased over conventional force transducers that have strict mechanical tolerances, often requiring additional shims and calibrations to closely align components. For example, the LED of the encoder component emits the light through a larger opening of the encoder component than the light input window of the encoder strip. As the encoder strip moves relative to the encoder component, the smaller opening of the light input window is always fully illuminated by the LED light through the larger opening of the encoder component. Similarly, the etched lines of the encoder strip are designed to accommodate assembly tolerances, and the etched lines expand beyond the gradated slots in the encoder component in any position of the encoder strip relative to the encoder component.

While features and concepts of a linear encoder force transducer can be implemented in any number of different devices, systems, environments, and/or configurations, implementations of a linear encoder force transducer are described in the context of the following example devices, systems, and methods.

Figure 1:
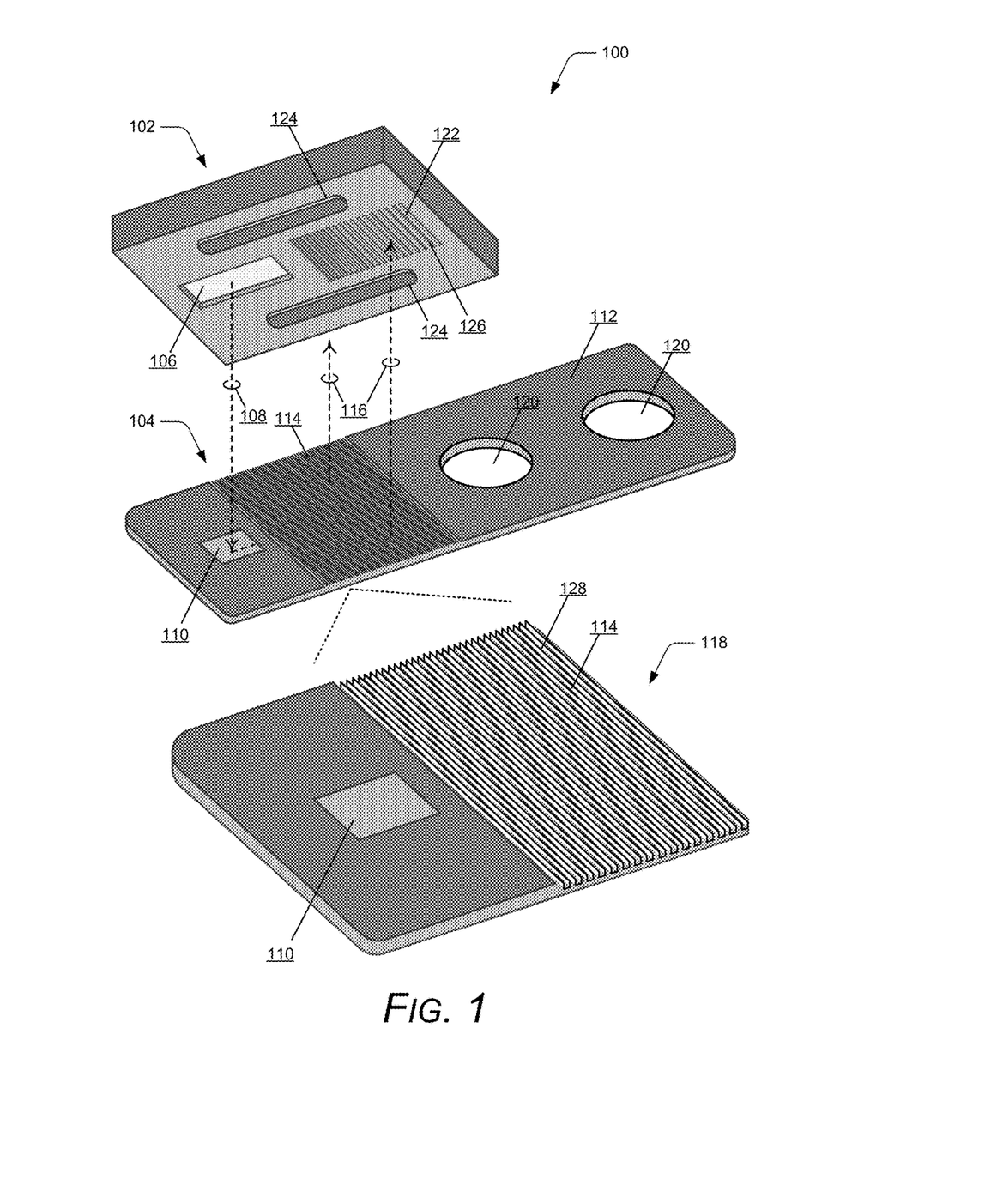
FIG. 1 illustrates an example linear encoder that can be implemented as a force transducer in accordance with implementations of a computer input pen.
Figure 2:
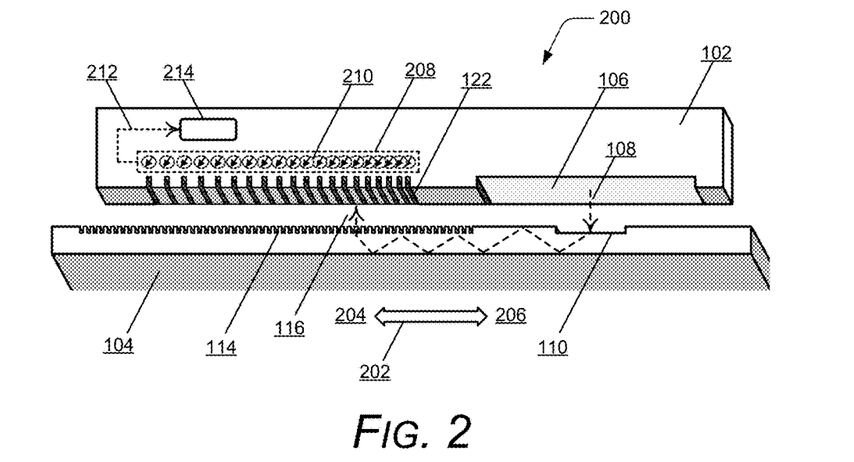
FIG. 2 further illustrates an example of the linear encoder shown and described with reference to FIG. 1.

FIG. 1 illustrates an example linear encoder 100 that can be implemented as a force transducer in examples of a linear encoder force transducer as described herein. The linear encoder 100 includes an encoder component 102 and an encoder strip 104 that are designed to move relative to each other along a parallel axis, such as with the encoder component 102 over the encoder strip 104 as shown in FIG. 2. The encoder component 102 can be implemented with a light emitting diode (LED) 106, or other light source, that generates light 108. The encoder strip 104 has a light input window 110 for the light 108 that is generated by the LED 106 of the encoder component 102 to enter the encoder strip. The encoder strip 104 can be formed from an optical grade, molded plastic, carbon, acrylic, or similar transparent material. The encoder strip 104 is formed with reflective surfaces 112 (e.g., top and bottom) that have reflective light dispersal particles designed to reflect and disperse the light 108 internally within the encoder strip.

In implementations, the top reflective surface 112 may be a printed opaque mask in which the light input window 110 is formed, and etched lines 114 are formed cross-width of the encoder strip 104 for emitted light 116 that exits the encoder strip. Although the emitted light 116 is shown represented by only the two arrows out of the etched lines 114, in practice, the emitted light 116 is approximately uniformly emitted from all of the etched lines 114 of the encoder strip 104. An expanded view of the etched lines 114 is further illustrated in the example shown at 118. In this example, the encoder strip 104 has ninety (90) equally spaced photo etched lines that are spaced at approximately a 0.03 mm pitch. In this example linear encoder 100, the encoder strip 104 also has two alignment holes 120 that can be utilized to align the encoder strip with pegs of an encoder strip mount in a device. An example of the linear encoder 100 with the encoder strip 104 implemented in a computer input pen is shown and described with reference to FIGS. 3-6.

As noted above, the light 108 that is generated by the LED 106 of the encoder component 102 enters the encoder strip. The encoder component 102 has gradated slots 122 through which the emitted light 116 that exits the encoder strip 104 is detected by an array of photo transistors, where each of the gradated slots 122 corresponds to one of the photo transistors in the array of photo transistors. The gradated slots 122 of the encoder component 102 have an incrementally increasing pitch (i.e., spacing) between the slots, and the spacing feature is also shown in FIG. 2. In this example, the encoder component 102 has twenty (20) of the gradated slots 122, each one having a width of approximately 0.35 mm.

In implementations, such as shown in FIG. 2 with the encoder component 102 over the encoder strip 104, the etched lines 114 of the encoder strip move relative to the gradated slots 122 of the encoder component. The shuttering effect is a Moiré pattern for each pitch distance moved. The photo transistors that each correspond to one of the gradated slots 122 (also shown in FIG. 2) detect peak lighting progressively with each pitch distance 0.03 mm traveled. In this example, the digital resolution would be 0.35 mm/0.03 mm*20 gradated slots=233 digital counts. Accordingly, the light can shutter on the twenty (20) photo transistors to attain two-hundred thirty-three (233) digital counts with the linear encoder for each 0.35 mm movement of the encoder strip 104 relative to the encoder component 102. In other implementations, the linear encoder 100 is scalable, where the encoder component 102 may include more or less of the gradated slots 122 and/or the encoder strip 104 may include more or less of the etched lines 114 for varying digital resolution of the linear encoder.

A linear displacement can then be determined based on one or more of the photo transistors in the encoder component 102 detecting the emitted light 116 from the encoder strip 104 as the encoder strip moves relative to the encoder component. As noted above, the etched lines 114 of the encoder strip 104 move relative to the gradated slots 122 of the encoder component 102 in a Moiré pattern from which the linear displacement is determinable. As shown and described with reference to FIGS. 3-5, the linear displacement can be representative of a force applied to a pen tip of a computer input pen (also referred to as a stylus, a pen, and/or an input device) configured for use on a touchscreen display of a computing device. A digital counter can be implemented with an AND gate summation process to register the incremental steps of digital resolution as the etched lines 114 of the encoder strip 104 move relative to the gradated slots 122 of the encoder component 102, and from which the linear displacement is determinable. In implementations, the digital counter is an up-down counter, and may be designed for the summation process with AND gates or with any other types of gate logic and/or components that register the incremental steps of digital resolution.

In this example of the linear encoder 100, the encoder component 102 includes standoffs 124 that moveably contact the encoder strip 104 as the encoder strip moves relative to the encoder component. The standoffs 124 are designed to maintain separation between the optical surfaces 126 of the gradated slots 122 of the encoder component and the optical surfaces 128 of the etched lines 114 of the encoder strip. The standoffs 124 integrated in encoder component 102 prevent wear on the encoder strip 104, allowing the encoder component and encoder strip to slide easily while preventing the optical surfaces scuffing together.

FIG. 2 further illustrates an example 200 of the linear encoder 100 that can be implemented as a force transducer in examples of a linear encoder force transducer as described herein. As described above with reference to FIG. 1, the linear encoder 100 includes the encoder component 102 and the encoder strip 104 that are designed to move relative to each other along a parallel axis 202, such as with the encoder component 102 over the encoder strip 104. In various implementations, the encoder component 102 may be fixed in position, such as in a device, and the encoder strip 104 moves in either direction 204, 206 relative to the encoder component. Alternatively, the encoder strip 104 may be fixed in position and the encoder component 102 moves relative to the encoder strip. Alternatively, both the encoder component 102 and the encoder strip 104 may be designed to move in a device relative to each other.

Figure 3:
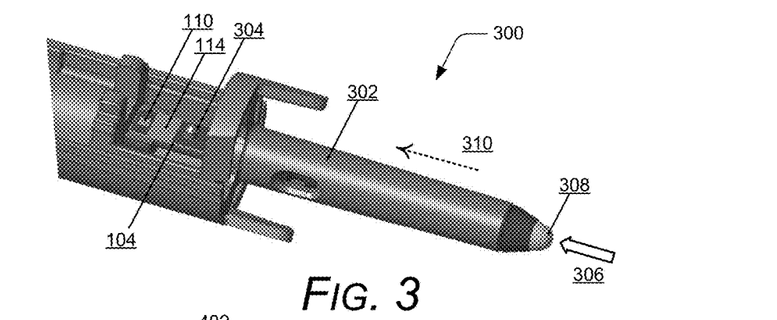
FIGS. 3 and 4 illustrate an example implementation of the linear encoder implemented as a force transducer in a computer input pen.

FIG. 3 illustrates an example 300 of the encoder strip 104 implemented as part of a linear encoder force transducer in a pen tip mechanism 302 of a computer input pen (also referred to as a stylus, a pen, and/or an input device). The two alignment holes 120 in the encoder strip 104 are utilized to align the encoder strip with pegs 304 (only one is shown) of an encoder strip mount in the computer input pen. When a force 306 is applied to the pen tip 308 of the computer input pen (e.g., as the pen tip is depressed on a touchscreen display of a computing device), the encoder strip 104 moves in a left direction 310 (relative to the illustrated example) along with the pen tip mechanism 302.

Figure 4:
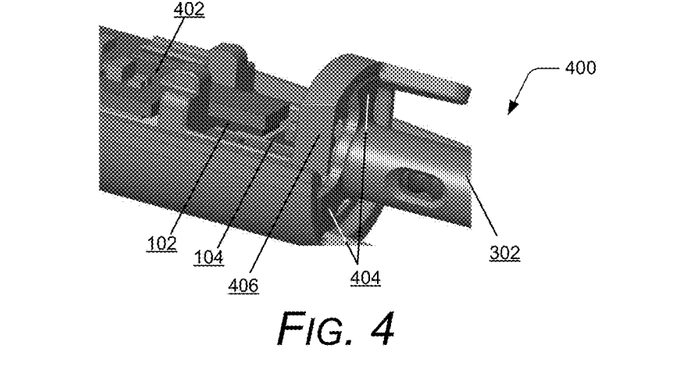

FIG. 4 further illustrates an example 400 of the encoder strip 104 and the encoder component 102 implemented as a linear encoder force transducer that connects to a printed circuit board (PCB) 402 in the computer input pen. The PCB 402 and the encoder component 102 are stationary in a fixed position in the computer input pen and the encoder strip 104 moves relative to the encoder component. The PCB 402 and the encoder component 102 locates the LED and photo transistor package above the encoder strip 104 for force quantity measurement as a linear encoder force transducer. The example 400 also illustrates the feature of integrated spoke springs 404 of the pen tip mechanism 302 that recess into a formed housing 406 of the computer input pen. The integrated spoke springs 404 provide a spring resistance that opposes the force 306 applied to the pen tip 308, and returns the pen tip to a rest position after linear displacement.

As shown in the example 200 (FIG. 2), the encoder strip 104 has the light input window 110 for the light 108 that is generated by the LED 106 of the encoder component 102 to enter the encoder strip, and the light is reflected and dispersed internally within the encoder strip. The light exits the encoder strip 104 via the etched lines 114 as the emitted light 116. It should be noted that the encoder strip 104 does not require power or light to operate, as the light that is reflected and dispersed internally within the encoder strip is generated by the encoder component 102. Further, assembly tolerances of the linear encoder force transducer described herein are significantly increased over conventional devices that have strict mechanical tolerances, often requiring additional shims and precise calibrations to closely align components. In this example, the LED 106 emits the light 108 through a larger opening of the encoder component 102 than the light input window 110 of the encoder strip 104. As the encoder strip 104 moves relative to the encoder component 102, the smaller opening of the light input window 110 is always fully illuminated by the light 108 through the larger opening of the encoder component. Similarly, the etched lines 114 of the encoder strip 104 are designed to accommodate assembly tolerances, and the etched lines 114 expand beyond the gradated slots 122 in the encoder component 102 in any position of the encoder strip 104 relative to the encoder component.

The encoder component 102 has the gradated slots 122 through which the emitted light 116 that exits the encoder strip 104 is detected by the array 208 of photo transistors 210, where each of the gradated slots 122 corresponds to one of the photo transistors 210 in the array 208 of photo transistors. As the etched lines 114 of the encoder strip 104 move relative to the gradated slots 122 of the encoder component 102, the photo transistors 210 that each correspond to one of the gradated slots 122 progressively detect the lighting with each pitch distance that the encoder strip travels, and the shuttering effect is a Moiré pattern.

An output signal 212 of the array 208 of photo transistors 210 is received by an encoder module 214 that implements the digital counter as an AND gate summation process to register the incremental steps of digital resolution as the etched lines 114 of the encoder strip 104 move relative to the gradated slots 122 of the encoder component 102. In implementations, the digital counter is an up-down counter, and may be designed for the summation process with AND gates or with any other types of gate logic and/or components that register the incremental steps of digital resolution. The linear displacement of the pen tip mechanism 302 is determinable from the digital counter of the encoder module 214. In implementations, an initial force 306 applied to the pen tip 308 of the computer input pen is assumed to be an increasing force, given that prior to the force being applied, the computer input pen was not in use and thus no force applied at the pen tip. The digital counter resets when left idle for a duration of time, and digitally counts up when the initial force 306 is applied.

As a user begins to depress the pen tip 308 on a touchscreen display of a computing device, the encoder module 214 of the linear encoder force transducer registers the linear displacement of the pen tip mechanism 302 as a positive, digital count. Similarly, as the user releases application of pressure on the touchscreen display (e.g., when the user lifts or partially lifts the pen tip 308 off of the touchscreen display), the digital counter digitally counts down to represent the decrease in linear displacement. When implemented with the AND gate summation process, an output signal 212 that is repeated from the array 208 of photo transistors 210 indicates the decrease in linear displacement as the user releases the application of pressure on the pen tip 308.

Figure 5:
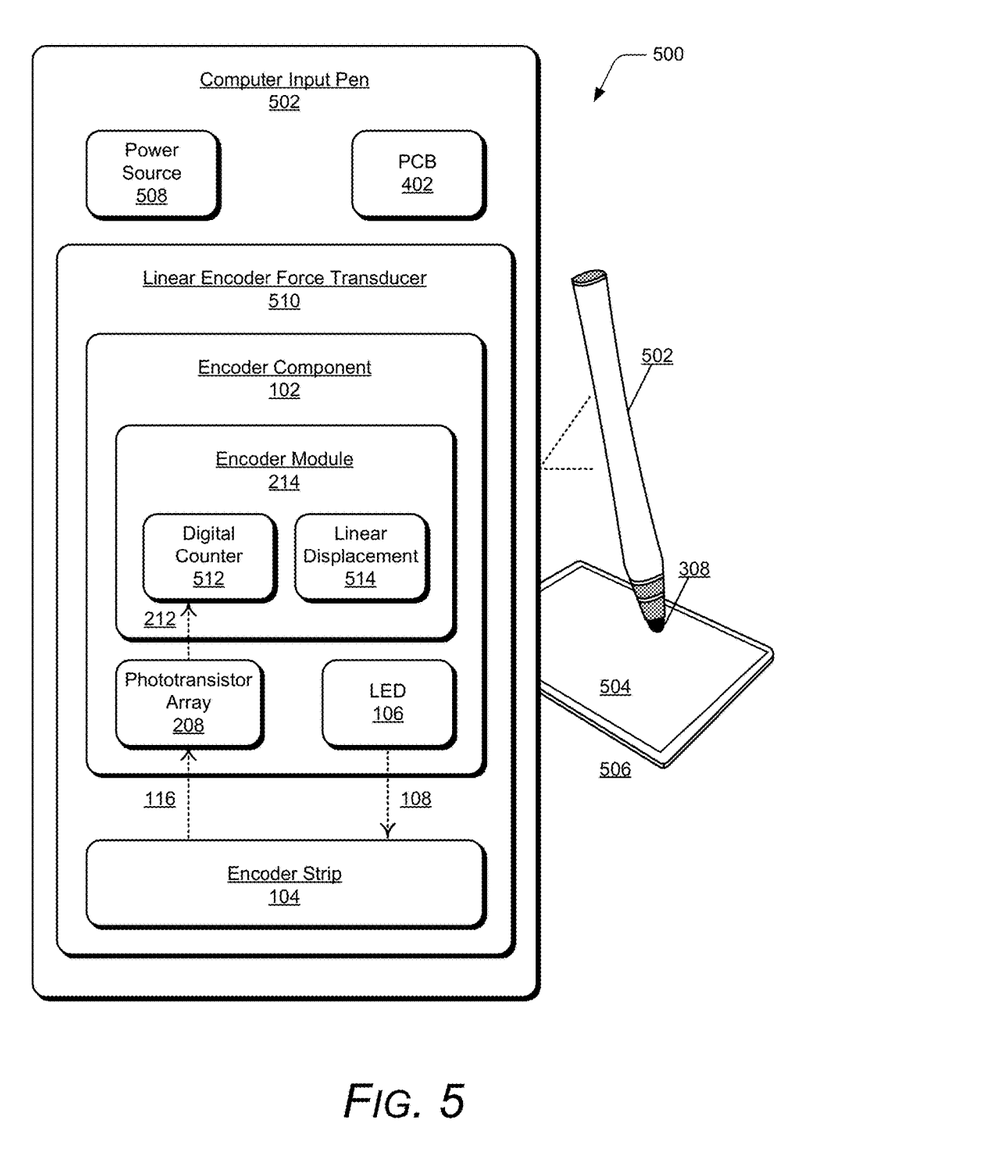
FIG. 5 illustrates an example system with a computer input pen that implements a linear encoder force transducer.

FIG. 5 illustrates an example system 500 in which examples of a linear encoder force transducer can be implemented. A computer input pen 502 can be utilized as an input device on a touchscreen display 504 of a computing device 506 (e.g., a tablet device or a mobile phone). Generally, the computer input pen 502 may be implemented with various components, such as a microprocessor, a memory, wireless communication components, and different types of sensors, such as a motion sensor, proximity sensor, etc. (components not shown). The computer input pen 502 includes the printed circuit board (PCB) 402 to connect the various components and a power source 508 to power the various components of the input device. The power source 508 may include a battery, a flexible strip battery, a rechargeable battery, and/or any other type of active or passive power source.

In implementations, the computer input pen 502 includes a linear encoder force transducer 510, as described herein. The linear encoder force transducer 510 includes the encoder component 102, the encoder strip 104, and the encoder module 214 as shown and described with reference to the previous FIGS. 1-4. In implementations, the encoder module 214 may be a software application or software module, such as computer-executable software instructions that are executable with a microprocessor of the input device and stored on computer-readable storage memory, such as any suitable memory device or electronic data storage implemented in the input device.

The encoder component 102 includes the LED 106 that generates the light 108, which illuminates the encoder strip 104, and the light is reflected and dispersed internally within the encoder strip. The light exits the encoder strip 104 via the etched lines 114 as the emitted light 116 and the array 208 of photo transistors detect the light through the gradated slots 122 of the encoder component 102. The output signal 212 of the array 208 of photo transistors is received by the encoder module 214 that implements the digital counter 512 as an AND gate summation process (or with other types of gate logic and/or components) to register the incremental steps of digital resolution as the encoder strip 104 moves relative to the encoder component 102. The linear displacement 514 of the pen tip mechanism 302 is determinable from the digital counter 512 of the encoder module 214.

Example method 600 is described with reference to FIG. 6 in accordance with one or more examples of a linear encoder force transducer. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
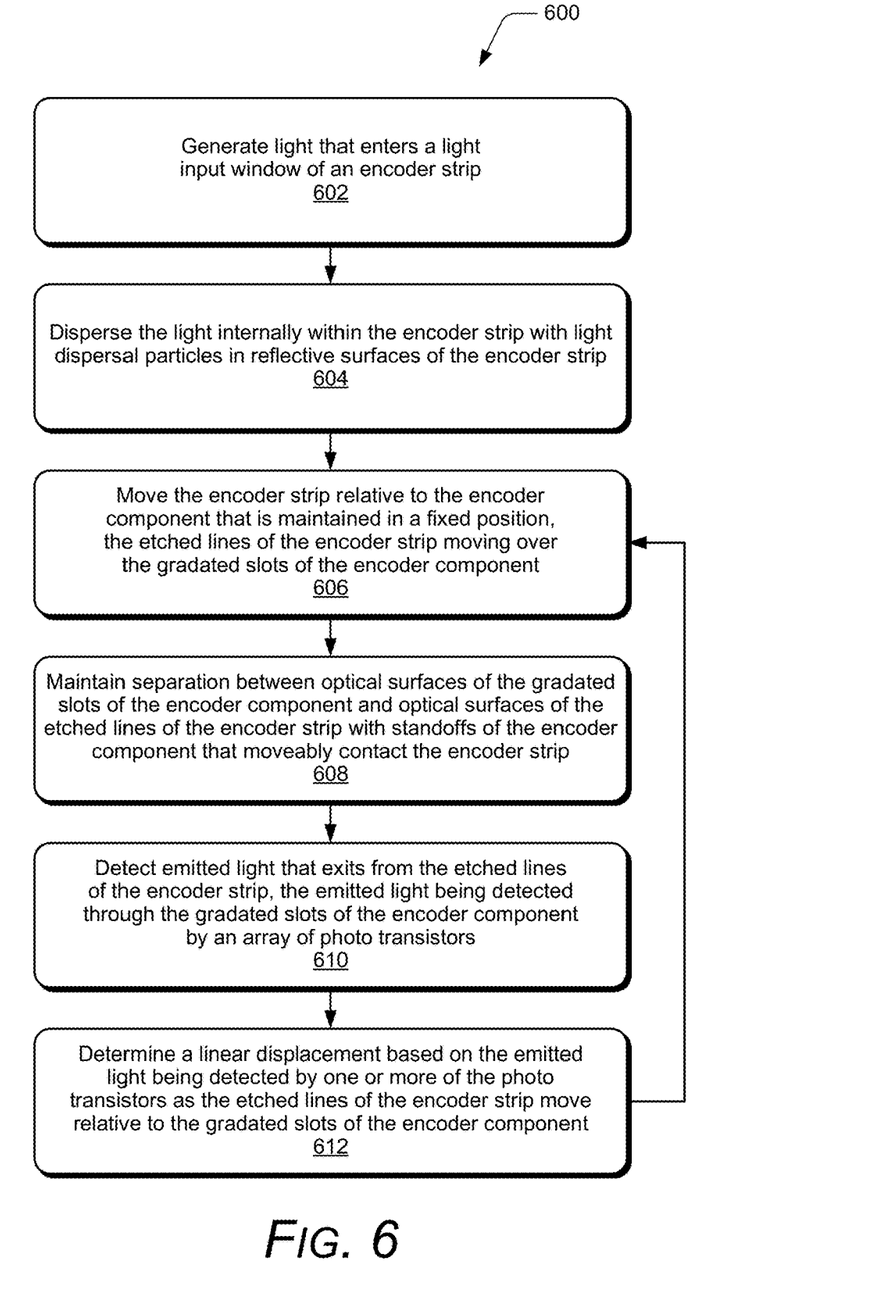
FIG. 6 illustrates an example method of a linear encoder force transducer in accordance with one or more implementations.

FIG. 6 illustrates an example method 600 of a linear encoder force transducer. The order in which the method is described is not intended to be construed as a limitation, and any number or combination of the method operations can be performed in any order to implement a method, or an alternate method.

At 602, light is generated that enters a light input window of an encoder strip. For example, the encoder component 102 includes the light emitting diode (LED) 106, or other light source, that generates the light 108, which enters the light input window 110 of the encoder strip 104.

At 604, the light is dispersed internally within the encoder strip with light dispersal particles in reflective surfaces of the encoder strip. For example, the encoder strip 104 has the reflective surfaces 112 with light dispersal particles that disperse the light 108 internally and approximately uniformly throughout the encoder strip.

At 606, the encoder strip moves relative to the encoder component that is maintained in a fixed position, where the etched lines of the encoder strip move over the gradated slots of the encoder component. For example, the encoder component 102 can be maintained in a fixed position, such as when implemented in the computer input pen 502, and the encoder strip 104 moves relative to the encoder component along with the pen tip mechanism 302. As the encoder strip 104 moves, the etched lines 114 of the encoder strip move over the gradated slots 122 of the encoder component. The etched lines 114 of the encoder strip 104 move relative to the gradated slots 122 of the encoder component 102 in a Moiré pattern from which the linear displacement 514 is determinable.

At 608, separation is maintained between optical surfaces of the gradated slots of the encoder component and optical surfaces of the etched lines of the encoder strip with standoffs of the encoder component that moveably contact the encoder strip. For example, the encoder component 102 includes the standoffs 124 that moveably contact the encoder strip 104, and the standoffs maintain separation between the optical surfaces 126 of the gradated slots 122 of the encoder component 102 and the optical surfaces 128 of the etched lines 114 of the encoder strip 104.

At 610, emitted light that exits from the etched lines of the encoder strip is detected through the gradated slots of the encoder component by an array of photo transistors. For example, the emitted light 116 exits the encoder strip 104 through the etched lines 114 of the encoder strip 104, and the emitted light 116 is detected through the gradated slots 122 of the encoder component 102 by the array 208 of photo transistors 210, where each of the gradated slots 122 corresponds to one of the photo transistors 210 in the array 208 of photo transistors.

At 612, a linear displacement is determined based on the emitted light being detected by one or more of the photo transistors as the etched lines of the encoder strip move relative to the gradated slots of the encoder component. For example, the encoder module 214 of the encoder component 102 determines the linear displacement 514 based on the emitted light 116 being detected by one or more of the photo transistors 210 as the etched lines 114 of the encoder strip 104 move relative to the gradated slots 122 of the encoder component. The linear displacement 514 can be determined from the digital counter 512 that registers incremental steps of digital resolution as the etched lines 114 of the encoder strip 104 move relative to the gradated slots 122 of the encoder component 102. In implementations, the linear displacement 514 is representative of the force 306 applied to the pen tip 308 of the computer input pen 502 when used on a touchscreen display of a computing device.

Although implementations of a linear encoder force transducer have been described in language specific to features and/or methods, the appended claims are not necessarily limited to the specific features or methods described. Rather, the specific features and methods are disclosed as example implementations of a linear encoder force transducer, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following implementations.

A linear encoder, comprising: an encoder strip with a light input window for light to enter the encoder strip, the encoder strip including etched lines formed cross-width of the encoder strip for emitted light that exits the encoder strip; an encoder component with gradated slots through which the emitted light that exits the encoder strip is detected by an array of photo transistors, each of the gradated slots corresponding to one of the photo transistors in the array of photo transistors; and an encoder module configured to determine a linear displacement based on one or more of the photo transistors detecting the emitted light as the etched lines of the encoder strip move relative to the gradated slots of the encoder component.

Alternatively or in addition to the above described linear encoder configurable as a force transducer, any one or combination of: the encoder strip has reflective surfaces with light dispersal particles that disperse the light internally within the encoder strip. The encoder component is fixed in position and the encoder strip moves relative to the encoder component, the etched lines of the encoder strip moving over the gradated slots of the encoder component. The etched lines of the encoder strip move relative to the gradated slots of the encoder component in a Moiré pattern from which the linear displacement is determinable. The encoder component comprises a light emitting diode (LED) configured to emit the light that enters the light input window of the encoder strip. The linear displacement is representative of a force applied to a pen tip of a computer input pen configured for use on a touchscreen display of a computing device. The encoder module comprises a digital counter from which the linear displacement is determinable, the digital counter registering incremental steps of digital resolution as the etched lines of the encoder strip move relative to the gradated slots of the encoder component. The encoder component comprises standoffs that moveably contact the encoder strip, the standoffs configured to maintain separation between optical surfaces of the gradated slots of the encoder component and optical surfaces of the etched lines of the encoder strip.

A method implemented with a linear encoder force transducer, the method comprising: generating light that enters a light input window of an encoder strip; detecting emitted light that exits from etched lines of the encoder strip, the emitted light being detected through gradated slots of an encoder component by an array of photo transistors, each of the gradated slots corresponding to one of the photo transistors in the array of photo transistors; determining a linear displacement based on the emitted light being detected by one or more of the photo transistors as the etched lines of the encoder strip move relative to the gradated slots of the encoder component.

Alternatively or in addition to the above described method, any one or combination of: the method further comprising dispersing the light internally within the encoder strip with light dispersal particles in reflective surfaces of the encoder strip. The method further comprising moving the encoder strip relative to the encoder component that is maintained in a fixed position, the etched lines of the encoder strip said moving over the gradated slots of the encoder component. The method further comprising maintaining separation between optical surfaces of the gradated slots of the encoder component and optical surfaces of the etched lines of the encoder strip with standoffs of the encoder component that moveably contact the encoder strip. The etched lines of the encoder strip move relative to the gradated slots of the encoder component in a Moiré pattern from which the linear displacement is determinable. The method further comprising said determining the linear displacement from a digital counter that registers incremental steps of digital resolution as the etched lines of the encoder strip move relative to the gradated slots of the encoder component. The linear displacement is representative of a force applied to a pen tip of a computer input pen configured for use on a touchscreen display of a computing device.

A computer input pen implemented with a linear encoder force transducer, the computer input pen comprising: a pen tip usable on a touchscreen display of a computing device, the pen tip configured to register a force when contact is applied on the touchscreen display; a linear encoder configured to register the force of the pen tip, the linear encoder comprising: an encoder strip with etched lines for emitted light that exits the encoder strip; an encoder component with gradated slots through which the emitted light that exits the encoder strip is detected by an array of photo transistors, each of the gradated slots corresponding to one of the photo transistors in the array of photo transistors; and a digital counter configured to register the force of the pen tip as a linear displacement based on one or more of the photo transistors detecting the emitted light as the etched lines of the encoder strip move relative to the gradated slots of the encoder component.

Alternatively or in addition to the above described computer input pen implemented with a linear encoder force transducer, any one or combination of: the encoder component is fixed in the computer input pen and the encoder strip moves relative to the encoder component as the contact is applied on the touchscreen display, and the etched lines of the encoder strip move over the gradated slots of the encoder component in a Moiré pattern from which the linear displacement is determinable. The digital counter registers incremental steps of digital resolution as the etched lines of the encoder strip move relative to the gradated slots of the encoder component. The encoder strip comprises: a light input window for light generated by the encoder component to enter the encoder strip; reflective surfaces with light dispersal particles that disperse the light internally within the encoder strip; and etched lines formed cross-width of the encoder strip from which the emitted light exits. The linear encoder comprises standoffs that maintain separation between optical surfaces of the gradated slots of the encoder component and optical surfaces of the etched lines of the encoder strip as the encoder strip moves relative to the encoder component.

The invention claimed is:

1. A linear encoder, comprising:
   an encoder strip including etched lines for light which enters the encoder strip to exit the encoder strip;
   an encoder component, the encoder component and the encoder strip being configured to move relative to each other along a first axis, including a plurality of gradated slots having an incrementally increasing pitch in a first direction of the first axis between the gradated slots, the encoder component being configured to detect through the gradated slots the emitted light that exits the encoder strip for each of the gradated slots and provide corresponding output signals; and
   an encoder module configured to receive the output signals and determine a linear displacement based on the output signals received as the etched lines of the encoder strip move relative to the gradated slots of the encoder component.

2. The linear encoder as recited in claim 1, wherein the encoder strip includes light dispersal particles that disperse light entering a light input window included in the encoder strip internally within the encoder strip to exit the encoder strip through the etched lines of the encoder strip.

3. The linear encoder as recited in claim 1, wherein:
   the etched lines of the encoder strip are equally spaced at a first pitch distance; and
   movement of the etched lines of the encoder strip relative to the gradated slots of the encoder component results in a Moiré pattern shuttering of the emitted light that exits the encoder strip on the gradated slots wherein the gradated slots receive peak lighting progressively with each first pitch distance traveled.

4. A computer input device comprising:
   the linear encoder as recited in claim 1; and
   a spring arranged to provide a spring resistance that opposes movement of the encoder strip along the first axis.

5. The linear encoder as recited in claim 1, wherein the encoder component comprises standoffs that moveably contact the encoder strip, the standoffs configured to maintain separation between optical surfaces of the gradated slots of the encoder component and optical surfaces of the etched lines of the encoder strip.

6. The linear encoder as recited in claim 1, wherein the plurality of gradated slots includes twenty or more gradated slots arranged in the first direction.

7. The linear encoder as recited in claim 1, further comprising a light source, wherein the encoder strip includes a light input window arranged for light generated by the light source to enter the encoder strip.

8. The linear encoder as recited in claim 7, wherein:
the encoder strip includes a top surface facing the encoder component;
the light input window is formed on the top surface; and
the etched lines are formed on the top surface.

9. The linear encoder as recited in claim 8, wherein the light source is included in the encoder component.

10. A method implemented with a linear encoder force transducer, the method comprising:
generating light that enters a light input window included in an encoder strip;
detecting emitted light that enters the light input window and exits from etched lines of the encoder strip, the emitted light being detected through a plurality of gradated slots of an encoder component, the encoder component and the encoder strip being configured to move relative to each other along a first axis, the gradated slots having an incrementally increasing pitch in a first direction of the first axis between the gradated slots, for each of the gradated slots and outputting corresponding output signals;
determining a linear displacement based on the output signals as the etched lines of the encoder strip move relative to the gradated slots of the encoder component.

11. The method as recited in claim 10, further comprising:
dispersing the light entering the light input window of the encoder strip internally within the encoder strip with light dispersal particles included in the encoder strip to exit the encoder strip through the etched lines of the encoder strip.

12. The method as recited in claim 10, further comprising:
moving the encoder strip relative to the encoder component that is maintained in a fixed position, the etched lines of the encoder strip said moving over the gradated slots of the encoder component.

13. The method as recited in claim 10, further comprising:
maintaining separation between optical surfaces of the gradated slots of the encoder component and optical surfaces of the etched lines of the encoder strip with standoffs of the encoder component that moveably contact the encoder strip.

14. The method as recited in claim 10, wherein:
the etched lines of the encoder strip are equally spaced at a first pitch distance;
movement of the etched lines of the encoder strip relative to the gradated slots of the encoder component results in a Moiré pattern shuttering of the emitted light that exits the encoder strip on the gradated slots wherein the gradated slots receive peak lighting progressively with each first pitch distance traveled.

15. The method as recited in claim 10, further comprising providing a spring resistance that opposes movement of the encoder strip along a first axis, wherein the encoder strip and the encoder component are arranged to move relative to each other along the first axis.

16. A computer input pen implemented with a linear encoder force transducer, the computer input pen comprising:
a pen tip usable on a touchscreen display of a computing device, the pen tip configured to move in response to a force when contact of the pen tip is applied on the touchscreen display; and
a linear encoder configured to register the force applied to the pen tip, the linear encoder comprising:
an encoder strip including etched lines for emitted light that exits the encoder strip;
an encoder component, the encoder component and the encoder strip being configured to move relative to each other along a first axis, including a plurality of gradated slots having an incrementally increasing pitch in a first direction of the first axis between the gradated slots, the encoder component being configured to detect through the gradated slots the emitted light that exits the encoder strip for each of the gradated slots and provide corresponding output signals; and
a digital counter configured to receive the output signals and register the force applied to the pen tip as a linear displacement based on the output signals received as the etched lines of the encoder strip move relative to the gradated slots of the encoder component.

17. The computer input pen as recited in claim 16, wherein:
the encoder component is fixed in the computer input pen;
the encoder strip and the pen tip move relative to the encoder component as the contact is applied on the touchscreen display;
the etched lines of the encoder strip are equally spaced at a first pitch distance; and
movement of the etched lines of the encoder strip over the gradated slots of the encoder component results in a Moiré pattern shuttering of the emitted light that exits the encoder strip on the gradated slots wherein the gradated slots receive peak lighting progressively with each first pitch distance traveled.

18. The computer input pen as recited in claim 16, wherein the encoder strip comprises:
a light input window arranged for light generated by the encoder component to enter the encoder strip;
light dispersal particles that disperse the light entering the light input window internally within the encoder strip to exit the encoder strip through the etched lines of the encoder strip; and
the etched lines formed cross-width of the encoder strip from which the emitted light exits.

19. The computer input pen as recited in claim 16, wherein the linear encoder comprises standoffs that maintain separation between optical surfaces of the gradated slots of the encoder component and optical surfaces of the etched lines of the encoder strip as the encoder strip moves relative to the encoder component.

20. The computer input pen as recited in claim 16, wherein the plurality of gradated slots includes twenty or more gradated slots arranged in the first direction.

* * * * *